United States Patent Office 2,777,104
Patented Jan. 8, 1957

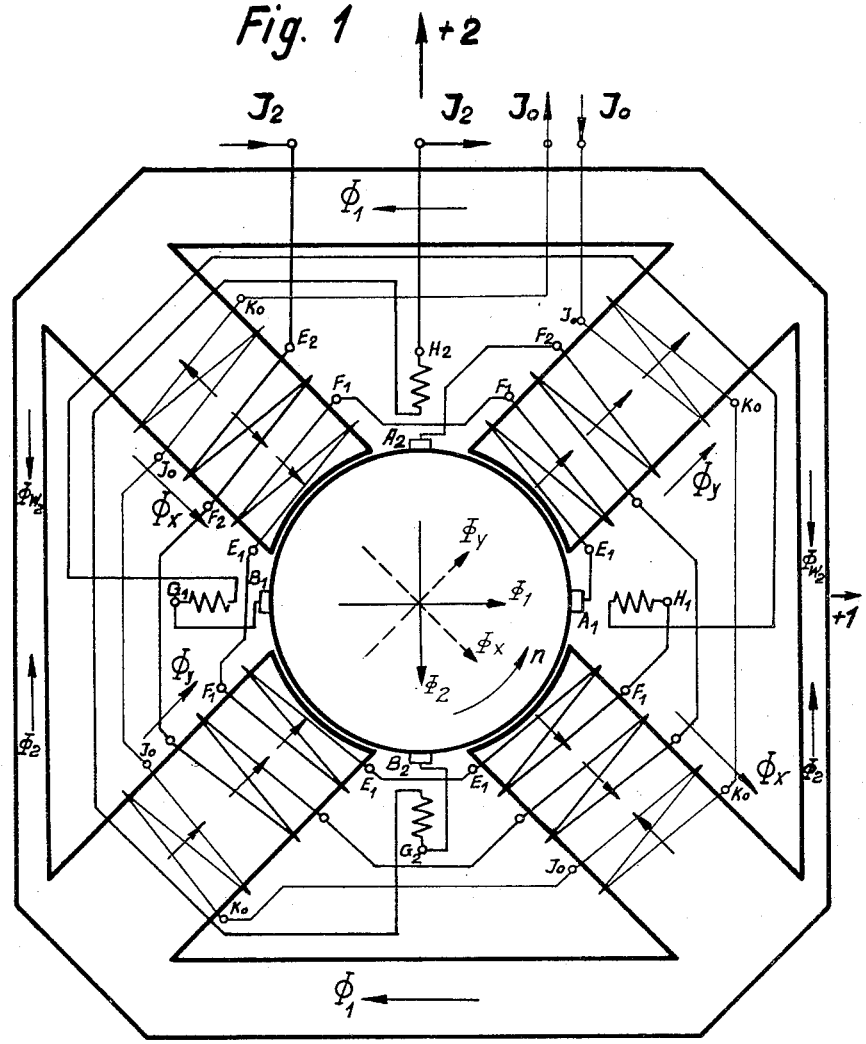

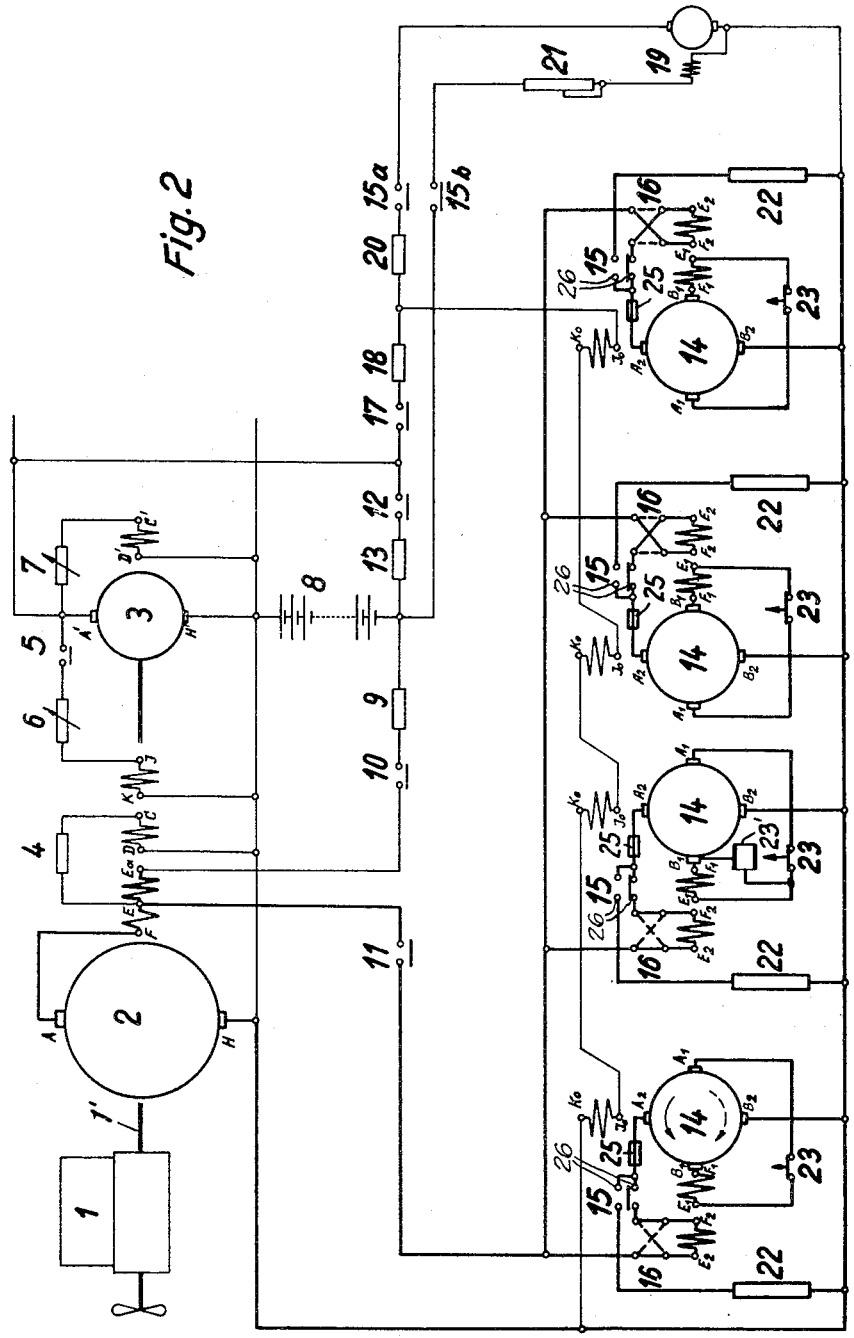

2,777,104

DRIVING ARRANGEMENT FOR ELECTRIC LOCOMOTIVES

Werner Nürnberg, Berlin-Nikolassee, and Walter Feill, Berlin-Friedenau, Germany, assignors to Licentia Patent-Verwaltungs-G. m. b. H., Hamburg, Germany Application February 6, 1951, Serial No. 209,604

Claims priority, application Germany February 10, 1950

13 Claims. (Cl. 318—144)

The present invention relates to a driving arrangement for electric locomotives, and more particularly to an arrangement which derives electrical energy either from a trolley wire or from a source of energy taken along on the locomotive such as a diesel engine coupled to a generator.

It is an object of the present invention to prevent automatically at low speeds the occurrence of currents required for high speeds as in the case for normal series motors.

It is a further object of the present invention to avoid an unnecessary heating of the electrical machines.

It is still another object of the present invention to provide an arrangement in which the speed characteristic of the motors does not unduly drop at low speeds.

A driving arrangement for electric locomotives according to the present invention comprises in its broadest aspects a shaft, an electric motor driving the shaft, and means for keeping constant the current in the motor.

A preferred embodiment of the present invention comprises in combination, a main generator having a first terminal and a second terminal, a shaft, an electric motor driving the shaft and having a first armature terminal and a second armature terminal, the first armature terminal of the motor being directly connected to the first terminal of the main generator, a switch having a first, second, and a third contact, said first contact being selectively connected with said second and third contacts, said first contact being connected with said second armature terminal, a braking device connected to the second contact of the switch, a device for reversing the rotation of the motor, the device being connected to the third contact of the switch and to the second terminal of the generator, and means for keeping constant the current in the motor.

Preferably an arrangement according to the present invention comprises in addition a series stator winding forming part of the motor, means for connecting the series stator winding between the second terminal of the main generator and the second terminal of the switch, means for reversing the current direction in said series stator winding, and means for keeping constant the current in the motor.

In a preferred embodiment of the present invention a separately excited or shunt stator winding forms part of the motor and is fed by a constant voltage source.

In a preferred embodiment of the present invention the main generator is driven by a diesel engine driving an auxiliary generator supplying a substantially constant voltage, and to which the separately excited stator winding is connected.

A preferred embodiment of the present invention comprises a dynamo driven by the motion of the locomotive and means actuated by a switch for separating the constant voltage source from the separately excited winding and for connecting the separately excited winding to said dynamo.

In a preferred embodiment of the present invention a field winding forms part of the dynamo and an adjustable resistor connected in series to the field winding can be connected to a direct current source when the means for connecting the separately excited winding to the dynamo is actuated.

In a preferred embodiment of the present invention a plurality of shafts is provided which are each driven by a separate electric motor. The motors are provided with series stator windings and separately excited stator windings, the separately excited stator windings being connected in series to one another. Preferably a plurality of simultaneously actuated switches are provided in series with the series stator windings. These switches connect in one position thereof the armatures to braking resistors and in the other position thereof connects the armatures to the series stator windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a wiring diagram of a constant current motor according to the present invention; and Fig. 2 is a wiring diagram of an entire arrangement according to the present invention including a diesel engine, a main generator, an auxiliary generator and four electric motors, each of the electric motors being of the type shown in Fig. 1.

Referring now to the drawings and first to Figure 1, a motor is shown the armature of which rotates in a direction of the arrow $n$ and is provided with a four-pole wave winding (not shown). The stator comprises four poles arranged with the axes thereof at an angle of 45° to the horizontal and vertical, and two horizontal yokes and two vertical yokes, each connecting the outer ends of two poles. The horizontal yokes carry the working flux $\Phi_1$ and have a relatively large cross-section. The vertical yokes carry only the difference of the regulating flux $\Phi_2$ and the flux $\Phi_{w2}$ of the commutating poles in line with the working axis+2 and thus can be designed with a much smaller cross-section which amounts to about a fifth of the cross-section of the poles.

The commutating poles arranged in the working axis+2 are indicated by two windings having, respectively, terminals $G_2$ and $H_2$ wheeras the commutating poles arranged in the short circuit axis+1 are indicated by windings having, respectively, terminals $G_1$ and $H_1$. The number of turns and the cross-sections of the conductors making up the windings are equal for the commutating poles along the two axes. The cross-section of the turns of the commutating poles is preferably large in order to keep as low as possible the resistance of the short circuit formed across armature brushes $A_1$, $B_1$ arranged in the short circuit axis+1 so as to obtain a strong short circuit current even at a slow rotation of the armature. The main poles each carry several field windings to be discussed more in detail presently.

The separately excited fundamental field winding $J_0K_0$ has its resultant magnetic-motive force in the direction of the working axis+2. As will be seen from Fig. 2 the windings $J_0K_0$ of all four motors or metadynes are connected in series and are connected, as a rule, to the voltage of an auxiliary generator 3. However, for braking purposes they are connected to a dynamo 19 to be more fully described hereinafter. The excitation of the windings $J_0K_0$ is not variable and is so chosen that a steady current amounting to approximately 85% of the continuous current is obtained. In this way it is accomplished that a certain reserve current for starting purposes and for ascending drives at low speed is available.

The field winding $E_1F_1$ is traversed by the short circuit current flowing through the two windings having terminals $G_1$ and $H_1$, respectively. As a result of the current flow through windings $E_1F_1$, a magnetic field is generated which has a resultant magneto-motive force acting in the direction of the short circuit axis $1$ i. e. in the magnetic direction of the field of the armature so that the magnetizing effect of the same is reinforced in this direction. The winding $E_1F_1$ carries current densities which are below the maximum current densities permissible for thermal reasons. In order to prevent dangerous excess currents from arising in the short circuit when the current is interrupted, the short circuit current loop contains an overload relay the contact 23 and winding 23' of which are shown in Fig. 2.

The current flowing through the series field windings $E_2F_2$ also flows through the armature winding of the motor thereby exciting both windings and as a result produces rotation of the motor.

The arrangement in space of the fluxes, currents, windings etc., is shown in Fig. 1. One pair of opposite poles carries a flux $\Phi_x = \Phi_1 + \Phi_2$ whereas the other pair of opposite poles carries a flux $\Phi_y = \Phi_1 - \Phi_2$.

The operation of the motor shown in Fig. 1 is as follows:

The series field windings $E_2F_2$ are connected in series with the brushes $A_2$ forming one terminal of the armature winding through which the current $J_2$ flows. The flux $1$ generated by this winding is directed in the armature horizontally from the left to the right. The cross field of the armature is directed in the line $A_2B_2$ vertically downward.

The separately excited windings $J_0K_0$ termed hereinafter the controlling field windings have a resultant flux traversing the armature in a vertical direction from below to above which thus counteracts the cross field of the armature. If the ratio of the working current $J_2$ to the current $J_0$ flowing in the winding $J_0K_0$ is so chosen that the ampere turns effective in the armature with respect to the middle of the pole arc are balanced by the ampere turns of the winding $J_0K_0$, the machine is compensated with respect to the middle of the pole arc. If A is the current coverage of the armature and $b$ is the width of the pole arc the circulation of current in the armature causing a distortion of the field in the ari gap is equal to $$A.b/2$$

and is under equal circumstances about half as large as with normal machines since the pole arc has a width amounting to about half the width of a pole arc of a normal machine. This means that for a given layout of the armature and for a given maximum number of revolutions only an approximately twice as large armature current causes a distortion of the field being just tolerable with respect to a flashover.

The armature is provided with two brushes $A_1$ and $B_1$ arranged in the gap between the two poles so that at the perfect compensation with respect to the middle of the pole arc mentioned heerinabove no voltage is induced between these brushes since the flux is zero in vertical direction. Therefore, the brushes $A_1B_1$ could be short-circuited without changing anything in the behavior of the machine at this operating point. If, however, the working current in the armature, for instance owing to an increase of the speed of the machine, is diminished and no longer equals the equilibrium value, the field produced by the control winding $J_0K_0$ exceeds the cross field so that a resultant flux directed vertically downwards is generated which induces a voltage between the brushes $A_1B_1$. The brush $B_1$ becomes a positive terminal and the current flowing in the armature from $A_1$ to $B_1$ generates a field which is opposed to the field generated by the series winding $E_2F_2$ and weakens the working flux.

By this the decrease of the working current $J_2$ is counteracted. Vice versa at a deviation of the working current $J_2$ from the desired value determined by the windings $J_0K_0$, a short-circuit current is generated through the armature in the direction from $B_1$ to $A_1$ which reinforces the main working flux and opposes an increase of current.

Since particularly in the upper speed range, the resistance of the short-circuit is very low, a very small component of the flux in vertical direction and thus a very small deviation of the working current from the desired value determined by the windings $J_0K_0$ is sufficient for causing a considerable change of the magnetic field. In consequence thereof the current $J_2$ taken by the motor deviates over a large range of speeds only very little from the desired value which can be adjusted at will by means of the excitation of the windings $J_0K_0$ so that the current $J_2$ is practically constant.

In order to obtain this field control by as small as possible currents in the short-circuit, the field windings $E_1F_1$ are arranged on the poles so that the short-circuit current $J_1$ flows through the windings $E_1F_1$, and aids the field generating effect of the armature winding in the direction $A_1B_1$.

Referring now to Fig. 2 showing the entire arrangement embodying four constant current motors, a diesel engine 1 drives a main generator 2 having two armature terminals or brushes A and H and an auxiliary generator 3 carrying two armature terminals or brushes A' and H'. The main generator 2 is provided with a series exciting winding EF, an auxiliary field winding $EE_a$, a self-excited shunt winding CD and a special winding JK which will be described more in detail hereinafter. A fixed resistor 4 is connected in series to the shunt winding CD. 5 is the contact of a protective relay (not shown) for the winding JK and 6 an adjustable resistor preferably a servo-resistor, for adjusting the amount of current flow in the winding JK. 7 is a voltage adjusting resistor connected in series with the shunt field winding C'D' of the auxiliary generator 3. 8 is a battery, 9 a current-limiting resistor, 10 the contact of a starting relay (not shown) and 11 the contact of a relay (not shown) for disconnecting the main generator 2 from the motors 14. In order to charge the battery 8 an automatic relay (not shown) having a contact 12 and a charging resistor 13 are provided. 14 represents four constant current motors or metadynes which are each designed as described hereinabove in connection with Fig. 1. Each motor 14 is provided with three field windings $J_0K_0$, $E_1F_1$ and $E_2F_2$ described more in detail hereinabove. 15 represents a switch for connecting, respectively, in one position thereof the windings $E_2F_2$ to the armatures of the motors and in the other position thereof for connecting the armatures of the motors to braking resistors 22. 16 represents reversing switches connected in such manner that upon actuation thereof the currents flowing in the windings $E_2F_2$ will be reversed, thereby reversing the sense of rotation of the armatures as indicated by the dotted arrow in the motor 14 shown at the lower lefthand corner of Fig. 2. In one position of the reversing switches 16 a connection along the full lines is established, whereas in the other position of the reversing switches the windings $E_2F_2$ are connected by a connection along the dotted lines. 17 represents the contact of a relay (not shown) protecting the windings $J_0K_0$ and is connected in series with a resistor 18 which limits the amount of current flowing in the windings $J_0K_0$. 19 is a dynamo driven by the motion of the locomotive and serves to brake said locomotive as more fully explained hereinafter. 20, 21, and 22 represent resistors of which resistor 21 is adjustable and connected in series with the field winding of the dynamo 19. The contacts 23 are connected in series with the short circuit windings $E_1F_1$, respectively, and actuated by relays whose windings 623' are connected between the brushes $A_1B_1$. The connection of the individual parts will be clear from Fig. 2.

The operation of this device is as follows:

The diesel engine 1 drives the armatures of the main generator 2 and the auxiliary generator 3. The self-excited field winding CD of the main generator 2 is connected through the fixed resistor 4 to the terminals H and A of the main generator. The field winding JK of the main generator 2 is connected by means of the contact 5 of the generator field relay (not shown) and the adjustable resistor 6 of the servo device (not shown) to the brushes A' and H' of the auxiliary generator 3. The adjustable resistor 6 is adjusted by the fuel-controlling device (not shown) of the diesel engine 1 in such a manner that the resistor 6 keeps constant the torque exerted on the shaft 1' of the diesel engine 1. The voltage supplied by the auxiliary generator 3 is kept constant, for instance at 135 volts, by the resistor 7 independently of the speed of rotation and the load on the generator.

For starting the diesel engine 1 a battery 8 is provided which is connected on the one hand through the current-limiting resistor 9 and the contact 10 of the starting relay (not shown) to the terminal $E_a$ and on the other hand to the terminal or brush H of the main generator 2. While contact 10 is closed the contact 11 of the relay (not shown) is in the open position. The function of the contact 11 is to disconnect the main generator 2 from the motors 14 when starting the diesel engine. The battery 8 is charged by the auxiliary generator 3 through the contact 12 of the charging relay (not shown) and the charging resistor 13.

The metadynes 14 have their respective terminals $B_2$ permanently connected to a common conductor which is also connected to the terminal H of the main generator 2. The terminals $A_2$ of the metadynes are connected, respectively, through fuses 25 to terminals 26 of the switching device 15 having two end positions in one of which the terminals 26 are connected to one terminal of the reversing switches 16. The reversing switches 16 are in turn connected at another terminal thereof, by means of contact 11 of the separating relay, with the terminal E of the main generator 2. In consequence of these connections the series stator windings are traversed by currents in the direction $E_2F_2$ or $F_2E_2$ according to the position of the reversing switches 16 so that the direction of rotation of the metadynes can be reversed as indicated by the arrows shown in the metadyne at the lower left-hand corner of Fig. 2.

The excitation of the generator 2 is produced by a plurality of field windings, namely by a series field winding EF through which the armature current flows, a shunt winding DC carrying a current depending on the terminal voltage of the generator 2, and a separately excited winding JK fed by the voltage of the auxiliary generator 3. The separate excitation provided by the winding JK is so strong with respect to the excitations provided by the windings EF and EC that in order to switch off the power only the contact 5 of the protective relay (not shown) has to be opened whereas in the working circuit no means for interrupting power currents have to be provided with the exception of the safety fuses 25. The separating relay with the contact 11 opens only when the contacts 5 and 17 are open so that contact 11 does not serve to interrupt any power current. The main function of contact 11 is to separate the generator 2 from the motors 14 when the diesel engine is started.

The windings $J_0K_0$ of the four metadynes are connected in series through the resistor 18 and the contact 17 to the voltage generated by the auxiliary generator 3. In consequence thereof the windings $J_0K_0$ are separately excited with a constant voltage supplied by the auxiliary generator 3. However, the windings $J_0K_0$ could be supplied from a different source having a constant voltage such as, for example, a trolley wire. Also the windings $J_0K_0$ could be designed, if desired as shunt windings. The currents of all metadynes 14 are equal because the control windings $J_0K_0$ which, as pointed out hereinabove, determine the current intake of the metadynes are connected in series so that they carry the same current. Thus it is seen that the current taken by the metadynes are independent of the speed over a relatively large range for instance from 20% to 100% of the maximum speed.

If it is intended to brake the motors 14 the control switch (not shown) is first brought to a position corresponding to idle running in which the field windings $J_0K_0$ are separated from the auxiliary generator 3 by opening the contact 17 and are then connected through the resistor 20 and the contact 15a to the voltage generated by the dynamo 19 driven by the motion of the locomotive. Prior to the closing of contact 15a the switch 15 has been brought to the end position opposite to that shown in the drawing in which the terminals 26 are separated from the reversing switches 16 and instead connected to the braking resistors 22, respectively. By means of the contact 15b which is also actuated simultaneously with the switch 15, the field winding of the dynamo 19 is connected through the adjustable resistor 21 to the battery 8. As a result of this arrangement braking of the engine is possible regardless of whether the diesel engine 1 is running or not. The adjustment of the braking stages is made by adjusting the resistor 21, the instantaneous resistance value of which determines the output voltage of dynamo 19.

In order to ventilate the motors 14 fans (not shown) are provided which are connected through fuses (not shown) to the terminals of the auxiliary generator 3. Preferably the braking resistors 22 are also cooled by the fans.

In order to prevent the short circuit currents from becoming excessive, excess current relays are connected to the armatures of the motors as described hereinabove, the contacts 23 and winding 23' of the relays being shown in Fig. 2. The secondary or short circuit loop can also be protected by fuses (not shown).

In trolley vehicles the fundamental field $J_0K_0$ has to be adjusted in small steps between a positive and a negative maximum, the transition from a positive to a negative excitation being the equivalent of a transition from accelerating to braking of the motors.

While we have illustrated and described the invention as embodied in driving arrangements, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to secure by Letters Patent is:

1. A driving arrangement for electric locomotives, comprising in combination, a main generator having a first terminal and a second terminal; a shaft; an electric motor driving said shaft and having a first armature terminal and second armature terminal, said first armature terminal of said motor being directly connected to said first terminal of said main generator; a switch having a first, second, and third contact, said first contact being selectively connected to said second and third contacts, said first contact being connected to said second armature terminal; a braking device connected to said second contact of said switch; a device for reversing the rotation of said motor, said device being connected to said third contact of said switch and to said second terminal of said generator; and means for keeping constant the current in said motor.

2. A driving arrangement for electric locomotives, comprising in combination, a main generator having a first terminal and a second terminal; a shaft; an electric motor driving said shaft and having a first armature terminal and a second armature terminal, said first armature terminal of said motor being directly connected to said first terminal of said main generator; a switch having a first, second, and third contact, said first contact being selectively connected to said second and third contacts, said first contact being connected to said second armature terminal; a braking device connected to said second contact of said switch; a series stator winding forming part of said motor; means for connecting said series stator winding between said second terminal of said main generator and said third contact of said switch; means for reversing the current direction in said series stator winding; and means for keeping constant the current in said motor.

3. A driving arrangement for electric locomotives, comprising in combination, a main generator having a first terminal and a second terminal; a shaft; an electric motor driving said shaft and having a first armature terminal and a second armature terminal, said first armature terminal of said motor being directly connected to said first terminal of said main generator; a switch having a first, second, and third contact, said first contact being selectively connected to said second and third contacts, said first contact being connected with said second armature terminal; a braking device connected to said second contact of said switch; a series stator winding for forming part of said motor; means for connecting said series stator winding between said second terminal of said main generator and said third contact of said switch; means for reversing the current direction in said series stator winding; a separately excited stator winding forming part of said motor; and a constant voltage source feeding said separately excited stator winding.

4. A driving arrangement for electric locomotives, comprising in combination, a Diesel engine; a main generator having a first terminal and a second terminal and being driven by said Diesel engine; an auxiliary generator driven by said diesel engine, said auxiliary generator supplying a substantially constant voltage; a shaft; an electric motor driving said shaft and having a first armature terminal and a second armature terminal, said first armature terminal of said motor being directly connected to said first terminal of said main generator; a switch having a first, second, and a third contact, said first contact being selectively connected to said second and third contacts, said first contact being connected with said second armature terminal; a braking device connected to said second contact of said switch; a series stator winding forming part of said motor; means for connecting said series stator winding between said second terminal of said main generator and said third contact of said switch; means for reversing the current direction in said series stator winding; and a separately excited stator winding forming part of said motor, said separately excited stator winding being fed by said auxiliary generator.

5. A driving arrangement for electric locomotives, comprising in combination, a main generator having a first terminal and a second terminal; a shaft; an electric motor driving said shaft and having a first armature terminal and a second armature terminal, said first armature terminal of said motor being directly connected to said first terminal of said main generator; a switch having a first, second, and a third contact, said first contact being selectively connected with said second and third contacts, said first contact being connected with said second armature terminal; a braking device connected to said second contact of said switch; a series stator winding forming part of said motor; means for connecting said series stator winding between said second terminal of said main generator and said third contact of said switch; means operatively connected to said series stator winding for reversing the current direction in said series stator winding; a separately excited stator winding forming part of said motor; a constant voltage source feeding said separately excited stator winding; a dynamo driven by the motion of the locomotive; and means actuated by said switch for separating said constant voltage source from said separately excited winding and for connecting said separately excited stator winding to said dynamo.

6. A driving arrangement for electric locomotives, comprising in combination, a Diesel engine; a main generator having a first terminal and a second terminal and being driven by said Diesel engine; an auxiliary generator driven by said Diesel engine, said auxiliary generator supplying a substantially constant voltage; a shaft; an electric motor driving said shaft and having a first armature terminal and a second armature terminal, said first armature terminal of said motor being directly connected to said first terminal of said main generator; a switch having a first, second, and a third contact, said first contact being selectively connected with said second and third contacts, said first contact being connected with said second armature terminal; a braking device connected to said second contact of said switch; a series stator winding forming part of said motor; means for connecting said series stator winding between said second terminal of said main generator and said third contact of said switch; means for reversing the current direction in said series stator winding; a separately excited stator winding forming part of said motor, said separately excited stator winding being fed by said auxiliary generator; a dynamo driven by the motion of the locomotive; and means actuated by said switch for separating said auxiliary generator from said separately excited winding and for connecting said separately excited winding to said dynamo.

7. A driving arrangement for electric locomotives, comprising in combination, a shaft; an electric motor driving said shaft; a first series stator winding forming part of said motor; a separately excited second stator winding forming part of said motor; a third stator winding traversed by short circuit currents in the armature of said motor; and means connected in series to said third stator winding for interrupting short circuit current flow when said short circuit currents reach a predetermined value.

8. A driving arrangement for electric locomotives, comprising in combination, a main generator having a first terminal and a second terminal; a shaft; an electric motor driving said shaft and having a first armature terminal and a second armature terminal, said first armature terminal of said motor being directly connected to said first terminal of said main generator; a switch having a first, second, and a third contact, said first contact being selectively connected with said second and third contacts, said first contact being connected with said second and third contacts, said first contact being connected with said second armature terminal; a braking device connected to said second contact of said switch; a first series stator winding forming part of said motor; means for connecting said series stator winding between said second terminal of said main generator and said third contact of said switch; means for reversing the current direction in said series stator winding; a separately excited second stator winding forming part of said motor; a constant voltage source feeding said separately excited stator winding; a third stator winding traversed by short circuit currents in the armature of said motor; and a means connected in series to said third stator winding for interrupting short circuit current flow when said short circuit currents reach a predetermined value.

9. A driving arrangement for electric locomotives, comprising in combination, a main generator having a first terminal and a second terminal; a plurality of shafts; a plurality of electric motors driving, respectively, said shafts and each having a first armature terminal and a second armature terminal, said first armature terminals of said motors being directly connected to said first terminal of said main generator; a plurality of simultaneously actuated switches having, respectively, a first, second, and a third contact, said first contact being selectively connected with said second and third contacts, said first contacts of said plurality of switches being connected with said second armature terminal of said plurality of electric motors, respectively; a plurality of braking resistors connected, respectively, to said second contacts of said switches; a plurality of series stator windings forming part, respectively, of said motors; means for connecting, respectively, said series stator windings between said second terminal of said main generator and said third contacts of said switches; means forming part of said series stator windings, respectively, for reversing the current directions in said series stator windings; a plurality of separately excited stator windings forming part, respectively, of said motors and being connected in series to one another; and a constant voltage source feeding said separately excited stator winding connected in series to one another.

10. A driving arrangement for electric locomotives, comprising in combination, a Diesel engine; a main generator having a first terminal and a second terminal and being driven by said Diesel engine; an auxiliary generator driven by said Diesel engine, said auxiliary generator supplying a substantially constant voltage; a plurality of shafts; a plurality of electric motors driving, respectively, said shafts and each having a first armature terminal and a second armature terminal, said first armature terminals of said motors being directly connected to said first terminal of said main generator; a plurality of simultaneously actuated switches having, respectively, a first, second, and third contacts, said first contact being selectively connected with said second and third contacts, said first contacts of said plurality of switches being connected with said second armature terminal of said plurality of electric motors, respectively; a plurality of braking resistors connected, respectively, to said second contacts of said switches; a plurality of series stator windings forming part, respectively, of said motors; means for connecting, respectively, said series stator windings between said second terminal of said main generator and said third contacts of said switches; means forming part of said series stator windings, respectively, for reversing the current directions in said series stator windings; and a plurality of separately excited stator windings forming part, respectively, of said motors and being connected in series to one another and being fed by said auxiliary generator.

11. A driving arrangement for electric locomotives, comprising in combination, a Diesel engine; a main generator having a first terminal and a second terminal and being driven by said Diesel engine; an auxiliary generator driven by said Diesel engine, said auxiliary generator supplying a substantially constant voltage; a plurality of shafts; a plurality of electric motors driving, respectively, said shafts and each having a first armature terminal and a second armature terminal, said first armature terminals of said motors being directly connected to said first terminal of said main generator; a plurality of simultaneously actuated switches having, respectively, a first, second and third contacts, said first contact being selectively connected with said second and third contacts, said first contacts of said plurality of switches being connected with said second armature terminal of said plurality of electric motors, respectively; a plurality of braking resistors connected, respectively, to said second contacts of said switches; a plurality of series stator windings forming part, respectively, of said motors; means for connecting, respectively, said series stator windings between said second terminal of said main generator and said third contacts of said switches; means forming part of said series stator windings, respectively, for reversing the current directions in said series stator windings; a plurality of separately excited stator windings forming part, respectively, of said motors and being connected in series to one another and being fed by said auxiliary generator; a dynamo driven by the motion of the locomotive; and means actuated by said simultaneously actuated switches for separating said auxiliary generator from said separately excited windings and for connecting the same to said dynamo.

12. A driving arrangement for electric locomotives, comprising in combination, a plurality of shafts; a plurality of electric motors, driving, respectively, said shafts; a plurality of first series stator windings forming part, respectively, of said motors; a plurality of separately excited second stator windings forming part, respectively, of said motors and being connected in series to one another; a plurality of third stator windings traversed, respectively, by short circuit currents of said motors; and a plurality of contacts connected, respectively, in series with said third stator windings, respectively, and opened when said short circuit currents reach predetermined values, respectively.

13. A driving arrangement for electric locomotives, comprising in combination, a Diesel engine; a main generator having a first terminal and a second terminal and being driven by said Diesel engine; an auxiliary generator driven by said Diesel engine, said auxiliary generator supplying a substantially constant voltage; a plurality of shafts; a plurality of electric motors driving, respectively, said shafts and each having a first armature terminal and a second armature terminal, said first armature terminals of said motors being directly connected to said first terminal of said main generator; a plurality of simultaneously actuated switches having, respectively, a first, second and third contacts, said first contact being selectively connected with said second and third contacts, said first contact of said plurality of switches being connected with said second armature terminal of said plurality of electric motors, respectively; a plurality of braking resistors connected, respectively, to said second contacts of said switches; a plurality of first series stator windings forming part, respectively, of said motors; means for connecting, respectively, said series stator windings between said second terminal of said main generator and said third contacts of said switches; means for reversing the current directions in said series stator windings; a plurality of separately excited second stator windings forming part, respectively, of said motors and being connected in series with one another and being fed by said auxiliary generator; a plurality of third stator windings traversed, respectively, by short circuit currents of said motors; and a plurality of contacts connected, respectively, in series with said third stator windings, respectively, and opened when said short circuit currents reach predetermined values, respectively.

References Cited in the file of this patent

UNITED STATES PATENTS 2,116,420    Whiting _____ May 3, 1938